United States Patent

Ionov et al.

Patent Number: 6,137,813
Date of Patent: Oct. 24, 2000

[54] YB-DOPED FIBER LASER OPERATING NEAR EDFA ABSORPTION BAND

[75] Inventors: Stanislav I. Ionov, Calabasas; Dennis C. Jones, Malibu, both of Calif.

[73] Assignee: Hughes Electronics Corporation, El Segundo, Calif.

[21] Appl. No.: 09/058,538

[22] Filed: Apr. 10, 1998

[51] Int. Cl.[7] .............................. H01S 3/30; H01S 3/098; G02B 6/26

[52] U.S. Cl. ...................... 372/6; 372/6; 372/18; 385/31

[58] Field of Search .................. 372/6, 72, 92, 372/95, 98, 18; 385/31

[56] References Cited

U.S. PATENT DOCUMENTS

| | | | |
|---|---|---|---|
| 5,659,644 | 8/1997 | DiGiovanni et al. | 385/31 |
| 5,953,353 | 9/1999 | Headley et al. | 372/6 |
| 5,956,354 | 9/1999 | Yan | 372/18 |
| 5,991,314 | 11/1999 | Ionov et al. | 372/6 |

*Primary Examiner*—Frank G. Font
*Assistant Examiner*—Delma R. Flores Ruiz
*Attorney, Agent, or Firm*—Terje Gudmestad; M. W. Sales

[57] ABSTRACT

A Yb-doped fiber laser uses a homogeneously-broadened material. The disclosed laser design is particularly advantageous for operating the fiber laser between 970–980 nm and using this output as a pump for an Er-doped fiber amplifier (EDFA) having an absorption band between 970–990 nm. Using a homogeneously-broadened host glass, for example alumino-germano-silicate or fluoride glass, significantly reduces the inefficiency that can result from the three-level nature of Yb-doped fiber laser transitions that are required for operating it at approximately 976 nm.

5 Claims, 4 Drawing Sheets

YB-DOPED FIBER LASER OPERATING NEAR EDFA ABSORPTION BAND

BACKGROUND OF THE INVENTION (a) Field of the Invention

The present invention relates generally to Yb-doped fiber lasers. More particularly, it relates to an optimum host glass for a Yb-doped fiber laser operating near the absorption band of an Er-doped fiber amplifier (EDFA).

(b) Description of Related Art

Yb-doped fiber lasers are used in a variety of applications. As with all lasers, a fiber laser generates coherent light wherein the amplitude, polarization, frequency or wavelength, and phase of the output laser light can be controlled. In general, fiber lasers include an optical pump source, two reflectors comprising the optical cavity of a resonator, and an active region within the cavity. Unlike other lasers, the cavity and active region of a fiber laser are formed from an optical fiber. The fiber generally includes a doped glass core that acts as the laser's active region. In operation, the pump is coupled, via one end of the resonator, to the doped-glass core active region. The ions in the doped core are excited by the pump to generate light that is reflected between the reflectors. At least one of the reflectors of the resonator is partially reflective, thereby allowing a portion of the laser light to escape the cavity as the laser output.

Ytterbium (Yb) doped glass is an attractive core material for making efficient fiber lasers operating in the 970–1150 nm range. Of particular importance is operation at 970–980 nm because this wavelength has good overlap with the 980 nm absorption band of Er-doped fiber amplifiers (EDFA). However, Yb-doped fiber lasers operating at 970–980 nm can be more difficult to implement than Yb-doped lasers operating at 1020–1150 nm. This is because the operation at 1020–1150 nm involves a four-level laser scheme, while at 970–980 nm, the lasing process involves a three-level laser scheme. A four-level scheme, in general, results in a more efficient laser operation than a three-level scheme.

The differences between the three and four-level schemes are best illustrated by reference to the diagram shown in FIG. 1. The diagram illustrates a $Yb^{3+}$ energy level structure having a ground manifold, $^2F_{7/2}$ (comprised of energy levels (a)–(b)), and an excited manifold, $^2F_{5/2}$ (comprised of energy levels (e)–(g)). The spectroscopic notations $^2F_{7/2}$ and $^2F_{5/2}$ refer to the corresponding electronic structures of the Yb ion. At room temperature, almost all of the Yb ions reside on the ground level (a) of the lower manifold. The lasing process involves exciting ions in the active doped glass core of the fiber from the ground manifold to the excited manifold using an optical pump source. Pump photons are absorbed by the ions residing on the level (a) of the ground manifold, thereby exciting the ions to the energy levels of the excited manifold that are resonant with the pump radiation, generally to levels above level (e). Some ground level ions may be off-resonance with the pump radiation, and therefore are not excited and remain at level (a). The ions in levels (f) or (g) relax non-radiatively to level (e) followed by stimulated emission to the energy levels of the ground manifold that are resonant with the laser radiation. In a four-level scheme, such levels may only include those above level (a). The radiative transition to those levels is followed by rapid non-radiative decay to the ground level (a). Thus, the four-level transitions may be generally described as level (a) to level (f) (or (g)) to level (e) to level (b) (or (c) or (d)).

Because laser stimulated emission involves only excited levels (b)–(d) of the ground manifold, such radiation is off-resonance with the majority of ions residing on the level of the ground manifold. As a result, such radiation is not absorbed by the un-excited ions and the laser performance is not adversely affected by such absorption. In a three-level scheme, the ion excitation process is similar to that in the four-level scheme, in that it involves pump absorption from level (a) to levels (f) and (g), followed by non-radiative decay to level (e). Some of the ground-level ions may be off-resonance with the pump radiation, and therefore, they are not excited efficiently to the excited manifold. Unlike in the four-level scheme, the stimulated emission at the laser wavelength occurs between levels (e) and (a). Thus, the three-level transitions may be generally described as level (a) to level (f) (or (g)) to level (e) and back to level (a). Because most of the exited ions emit back to the bottom ground manifold level (a), any ions remaining in level (a) can absorb the laser light and thereby negatively affect laser performance.

Thus, there is a need for an improved Yb-doped fiber laser that reduces the inefficiencies originating from the three-level energy scheme that is required for operating such a laser near the absorption band of an Er-doped fiber amplifier (EDFA). In particular, there is a need for a Yb-doped fiber laser that reduces the lasing threshold (i.e., the amount of input power required before lasing begins) and increases slope efficiency (i.e., percentage of input power over the threshold that is converted to lasing power) when operating such a laser near the absorption band of an EDFA.

SUMMARY OF THE INVENTION

The present invention provides an improved Yb-doped fiber laser that reduces the inefficiencies originating from the three-level energy scheme that is required for operating such a laser near the absorption band of an EDFA. In particular, the present invention provides a Yb-doped fiber laser that improves the lasing threshold (i.e., the amount of input power required before lasing begins) and slope efficiency (i.e., percentage of input power over the threshold that is converted to lasing power) when operating such a laser near the absorption band of an EDFA. According to the present invention, the host glass of the Yb-doped core is made from a homogeneously-broadened material such as alumino-germano-silicate. The homogeneously-broadened host glass minimizes the number of ions that are left in level (a) of the ground manifold during the excitation process, thereby minimizing the number of ions that can absorb the laser light that is generated when the excited ions return to the ground manifold.

Accordingly, the present invention may be embodied in a fiber laser having: a light source that generates pump light; a fiber laser cavity having a core made from a Yb-doped host glass, said fiber having a first end and a second end; an optical resonator comprising a first reflective dichroic resonator element that transmits the pump light and reflects the laser light at said first fiber end and a second partially reflective resonator element at said second end, said light source coupled to said fiber first end through said first reflective dichroic resonator element; said fiber laser cavity, when excited by said source light, outputting laser light from said second resonator element at a wavelength between about 970 nm and about 980 nm; said light source excitation of said laser cavity comprising exciting ions in said Yb-doped host glass according to a three-level scheme; and said host glass comprising of an homogeneously-broadened material. The laser source may be a conventional laser such as a diode laser or some other type. The homogeneously-broadened material may include homogeneously-broadened glasses such as alumino-germano-silicate or fluoride glasses.

DESCRIPTION OF THE PREFERRED EMBODIMENTS

By way of introduction, a general description of the invention and the disclosed embodiments thereof will now be provided. The present invention may be embodied in a design and structure for a Yb-doped fiber laser operating between 970 and 980 nm. The particular design of the Yb-doped fiber laser is not critical to the present invention as long as the fiber laser includes Yb doping and outputs laser light in the wavelength range from 970–980 nm. Accordingly, the present invention would find use in a wide variety of Yb-doped, 970–980 nm lasers. One example of such a laser is disclosed in a co-pending commonly-owned application, filed on even date herewith and entitled "DESIGN OF A Yb-DOPED CP FIBER LASER FOR OPERATING NEAR EDFA ABSORPTION BAND" (Ser. No. 09/058,551 inventors, Stanislav I. Ionov, Dennis C. Jones and Metin S. Mangir).

Figure 3:
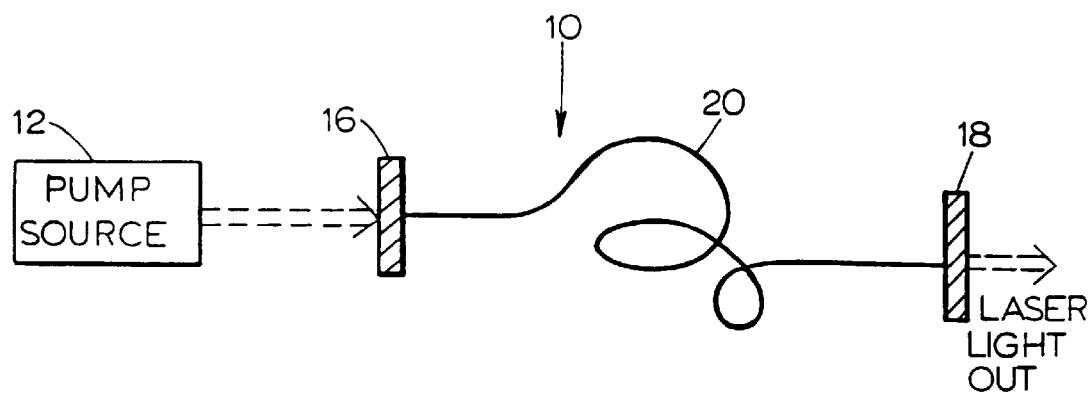
FIG. 3 is a diagram illustrating a general configuration of a fiber laser capable of utilizing the present invention.

FIG. 3 is a diagram illustrating a general configuration of a doped fiber laser 10 capable of utilizing the present invention. As with all lasers, the fiber laser 10 generates coherent light wherein the amplitude, polarization, frequency or wavelength, and phase of the output laser light can be controlled. The fiber laser 10 has conventional laser elements including a pump source 12, an optical resonator made of reflectors 16, 18, an optical cavity 20 between each end of the resonator 16, 18 of the resonator, and an active region 22 (shown in FIG. 4) within the cavity 20. Unlike other lasers, the laser cavity and active region of the fiber laser 10 are comprised of the doped core 22 of the fiber. The reflectors of the laser resonator may be either partially reflective mirrors, e.g., dichroic mirrors that transmit pump light and reflect the laser light, Fresnel reflections from the fiber ends, or in-fiber Bragg gratings. In operation, the light source 12 is coupled into the active region 22 via one end 16 of the resonator. The light emitted by the excited ions oscillates between the reflectors 16, 18 of the resonator and leaves the cavity via the partial reflector 18 as the output of the laser.

Figure 4:
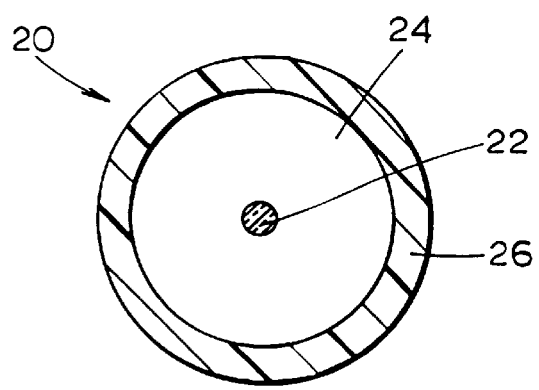
FIG. 4 is a cross-sectional view of the fiber comprising the active medium of the laser shown in FIG. 3.

FIG. 4 is a cross-sectional view of the fiber cavity 20 shown in FIG. 3. As shown, the fiber 20 includes a doped glass core 22. As in all fibers, the core is surrounded by a cladding 24 that confines the light in the vicinity of the core 22. The cladding 24 is usually surrounded by a protective polymer coating 26.

The fiber core 22 is doped with Ytterbium (Yb), which is an attractive material for making efficient fiber lasers operating in the 970–1150 nm range. Of particular importance is operation at 970–980 nm because this wavelength has good overlap with the 980 nm absorption band of Er-doped fiber amplifiers (EDFA). However, Yb-doped fiber lasers operating at 970–980 nm can be more difficult to implement than Yb-doped laser operating at 1020–1150 nm. This is because the operation of Yb-doped fiber lasers at 970–980 nm involves a three-level scheme, which in general, is more challenging to achieve than operation via a four-level scheme required for producing 1020–1150 nm output.

Figure 1:
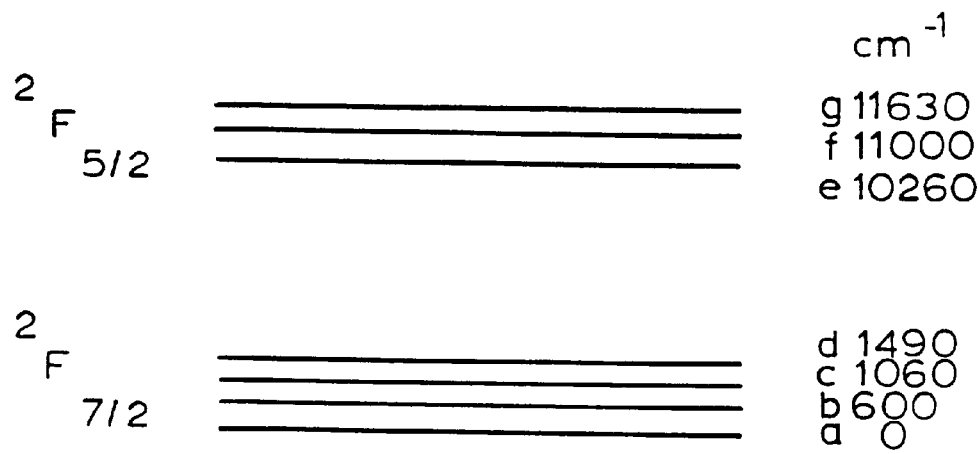
FIG. 1 is a diagram illustrating a $Yb^{3+}$ energy level structure having a ground manifold (energy levels (a)–(b)) and an excited manifold (energy levels (e)–(g))

The differences between the three and four-level schemes are illustrated by reference to the $Yb^{3+}$ energy level structure shown in FIG. 1. Only the ground and first excited manifolds, i.e. $^2F_{7/2}$ and $^2F_{5/2}$, respectively, are shown. The former is split by a crystalline field into four levels, (a)–(d), whereas the latter is split into three levels, (c)–(f). In general, the lasing process involves exciting ions in the doped glass core 22 of the fiber 20 from the ground manifold to the excited manifold using an optical pump source. The excited ions in the excited manifold then fall back to the ground manifold emitting light that will resonate in the fiber cavity and eventually be output from the fiber cavity as coherent laser light. Upon absorbing a pump photon, an $Yb^{3+}$ ion is transferred from level (a), where the majority of the ions reside at room temperature, to the levels (g) or (f) of the excited manifold. Some ground level ions are not excited by the light source and therefore remain at level (a). The ions excited to the levels (g) or (f) by the pump radiation fall rapidly to level (e) via a non-radiative process. The level (e) is the upper level for the stimulated laser emission in both three and four-level schemes.

In a four-level scheme, the lower level of the stimulated laser transition is any of (b), (c) or (d) levels. An ion occupying the upper laser level (e) is transferred down to the lower laser level via stimulated emission, thereby producing one quantum of laser radiation. The ions transferred down to the lower lasing level relax rapidly to the ground level (a) via a non-radiative process. Since laser emission does not involve directly the ground level (a) in the four-level scheme, this radiation is off-resonance with the ground-state ions. As a result, laser emission is not absorbed by most of the ions in the active medium that occupy the ground level (a), and the laser performance is not affected adversely by such absorption. In a three-level scheme the lower level of the laser transition is the ground level (a) of the lowest manifold. As a result, ions remaining in level (a) can absorb the laser light and thereby adversely affect the laser performance.

Figure 2:
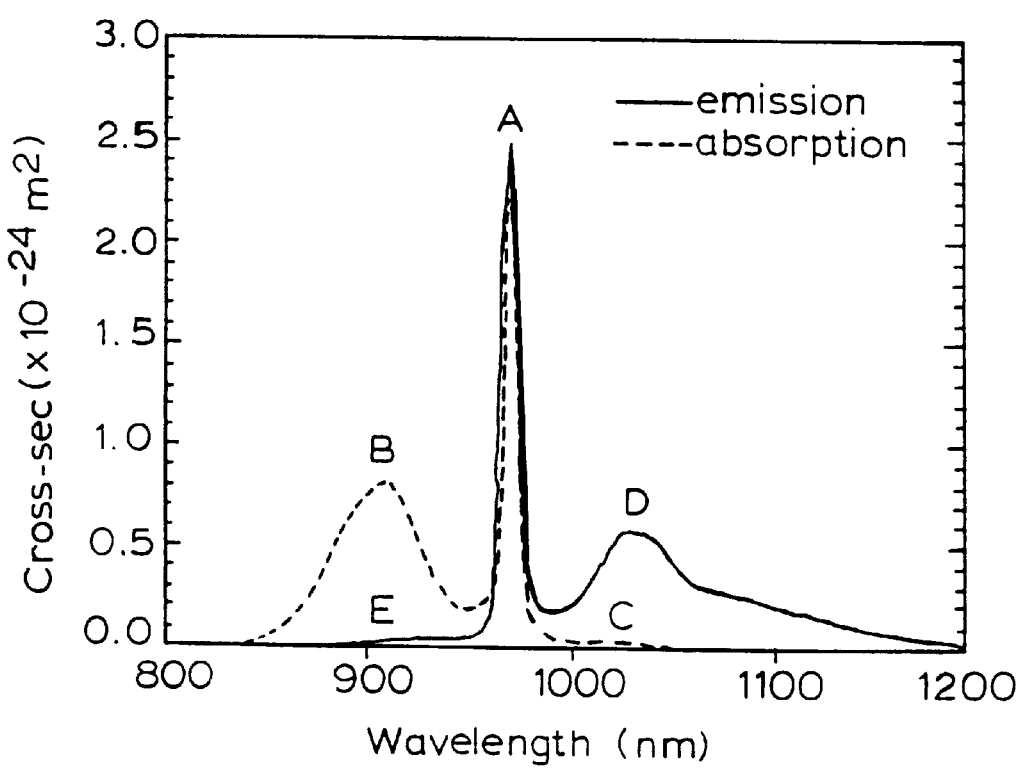
FIG. 2 is a graph showing absorption and emission cross sections for a germano-silicate host.

FIG. 2 illustrates an absorption and emission spectrum of $Yb^{3+}$-doped germano-silicate glass. A rather broad absorption band (B) corresponding to transitions from (a) to (f) and (g), is centered around 915 nm. A sharp absorption band and a sharp emission band (A) corresponding to the transitions between levels (a) and (e) are centered around 976 nm. A rather broad emission band (D) corresponding to transitions from levels (e) to levels (b)–(d) is centered around about 1020 nm. (E) is a relatively weak emission from (g) or (f) to levels on the ground manifold, and (C) is very weak absorption from levels other than (a) in the ground manifold.

In an inhomogeneously-broadened medium, dopants occupying different crystalline sites have distinctly different absorption and emission spectra. When subjected to a narrow-band radiation, the dopants occupying a particular crystalline site that are in resonance with the optical field interact with such radiation very efficiently (i.e., absorb light or undergo stimulated emissions), whereas the other dopants that are off-resonance are far less likely to undergo absorption or stimulated emission. In contrast to inhomogeneously-broadened media, homogeneously broadened ones have practically identical absorption spectra for all the dopants throughout the crystal. As a result, all the dopants interact with optical radiation with equal probability in such media.

It is well-known in the art that inhomogeneous broadening of the emission band results in reduced energy extraction from laser amplifiers seeded with narrow-band radiation. In this case, the seed beam does not interact with certain portion of excited atoms, and as a result, it does not extract the energy stored in those atoms. However, such inhomogeneous broadening of stimulated emission does not reduce the energy extraction from most laser oscillators. Laser oscillators tend to operate at multiple frequencies covering the entire emission spectrum, thus utilizing all the stored energy. However, as the present invention focuses on controlling the spectrum of the laser output in order to improve its overlap with $Er^{3+}$ absorption band, inhomogeneous broadening may reduce laser efficiency and increase its threshold.

Inhomogeneous broadening of absorption transitions may also affect the laser performance. In such media, there are several groups of dopant atoms occupying different crystalline sites that absorb at slightly different but distinct wavelengths. If narrow-band pump radiation is used, excitation efficiency of such media is reduced, since only the ions that are in resonance with the pump absorb radiation efficiently. However, such inhomogeneous broadening of the absorption band is usually of minor importance for conventional bulk (i.e., non-fiber based) lasers, since they are pumped by broad-band lamp sources that have high light intensity. Moreover, most commercial bulk lasers operate on a four-level scheme (e.g., widely used Nd:YAG or Nd:glass lasers), and therefore, the presence of unexcited ions does not affect their performance directly. As a result of its minor importance, the effects of inhomogeneous broadening in the absorption band are widely neglected in the laser literature.

Inhomogeneous broadening of absorption transition may be of a significant importance, however, for fiber lasers, especially for those operating on a three-level scheme, e.g., for Yb-doped fiber lasers operating near EDFA absorption band. Fiber lasers can only be pumped by coherent pump sources that have sufficiently good beam quality for coupling into the fiber. Such pump sources, in general, have much narrower emission spectra than those of broad-band lamps used for pumping bulk lasers. In inhomogeneously-broadened fiber laser media, only a certain fraction of ions that are in resonance with the narrow band pump absorb light efficiently. For efficient operation of a three-level laser, however, all of the ions must be inverted, since uninverted ones may still absorb at the laser wavelength. Therefore, a critical intensity has to be reached for every group of ions independently. This critical intensity may be very high for the ions that are off resonance with the pump radiation. Broadening the spectrum of pump lasers may reduce the critical power somewhat. In this case, however, the critical power is still high. It is approximately n times larger than that in homogeneously broadened media (where n is the number of ion groups absorbing at distinctly different wavelengths in an inhomogeneously-broadened medium), since a critical spectral brightness must be reached independently at each wavelength that is in resonance with a specific group of atoms.

The present invention provides an improved Yb-doped fiber laser that reduces the adverse effects associated with the three-level laser scheme that is required for operating such a laser near the absorption band of an Er-doped fiber amplifier (EDFA). In particular, the present invention provides a Yb-doped fiber laser that reduces the lasing threshold (i.e., the amount of input power required before lasing begins) and increases the slope efficiency (i.e., percentage of input power over the threshold that is converted to lasing power) when operating such a laser near the absorption band of an EDFA. According to the present invention, the host glass of the Yb-doped core is made from a homogeneously-broadened material such as alumino-germano-silicate glass. In a homogeneously-broadened $Yb^{3+}$-doped glass, the number of ions that are left un-excited in the ground-level (a) is minimized compared to an inhomogeneously-broadened glass. As a result, the number of ions that can absorb the laser light is minimized.

Figure 5:
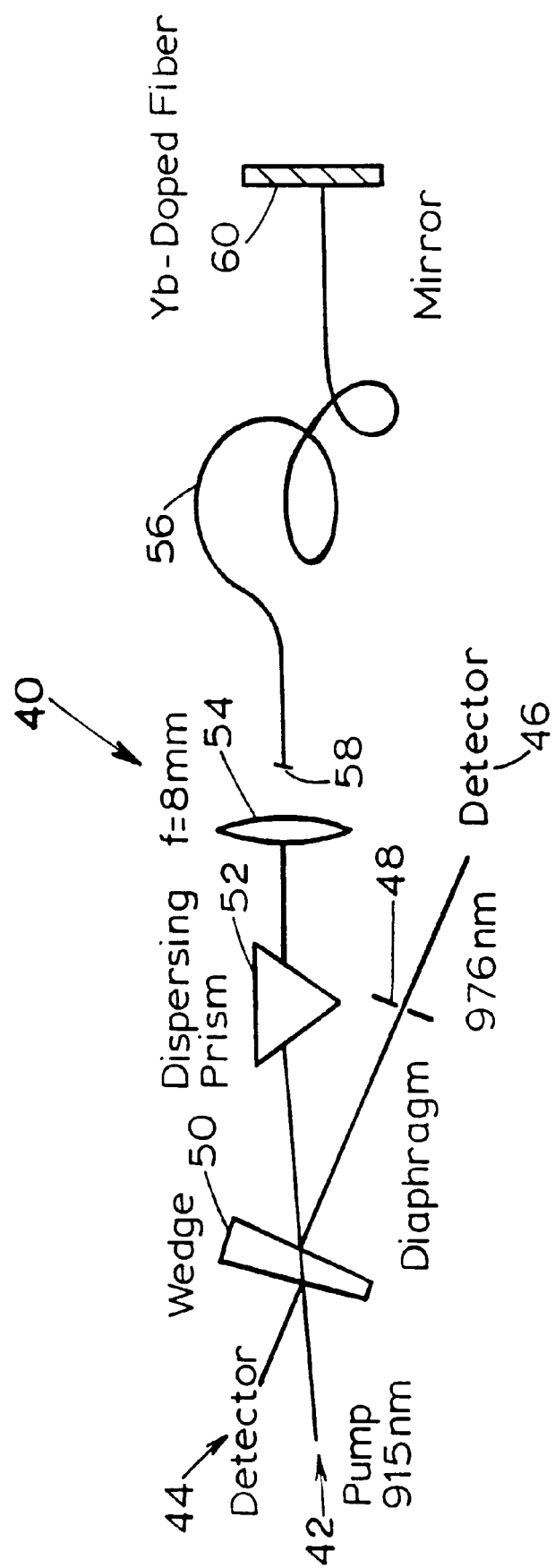
FIG. 5 is a diagram illustrating a test configuration for comparing the efficiency of a Yb-doped fiber laser having a inhomogeneously-broadened glass with the efficiency of a Yb-doped fiber laser having a homogeneously-broadened glass.

FIG. 5 illustrates a test configuration 40 for comparing the efficiency of a Yb-doped fiber laser having an inhomogeneously-broadened host glass with the efficiency of a Yb-doped fiber laser having a homogeneously broadened host glass. The test configuration 40 includes pump 42, a first detector 44, a second detector 46, a diaphragm 48, a glass wedge 50, a dispersing prism 52, a focusing objective 54, a Yb-doped fiber 56 having a cleaved end 58, and a mirror 60, arranged as shown. In the current embodiment, the pump 42 is a Ti:Saphire laser operating at 915 nm, and the focusing objective 54 has a focal length of about 8 mm.

The pump beam 42 propagates through the wedge 50, which reflects an approximately 4% portion of the pump light to the first detector 44 for measuring the power of the pump beam. The unreflected pump light passes through the prism 52. The purpose of the prism 52 will be described later in connection with the measurements of the output laser power. The pump light transmitted through the prism 52 is focused by the focusing objective 54 on the cleaved end 58 of the Yb-doped fiber 56. An airspace is present between the focusing objective 54 and the cleaved end 58. The pump light excites the Yb ions in the core of the fiber 56. The laser resonator is formed by the cleaved end 58 that provides approximately 4% Fresnel reflection and a mirror coupled to the opposite end of the fiber. The laser light oscillating within the laser resonator is eventually outcoupled through the cleaved end 58 of the fiber 56 to form the coherent laser output beam.

The output laser beam collimated by the objective 54 passes through the dispersing prism 52 to the wedge 50. The prism 52 is used for dispersing the output laser beam away from the portion of the pump beam reflected by the cleaved end 58 of the fiber 56. The wedged 50 reflects the laser light and the reflected pump light to the diaphragm 48 placed such that it selects the laser output beam while blocking the reflected pump light. The power of the laser output beam transmitted through the diaphragm 48 is measured by a second detector 46. Both detectors 44 and 46 have been calibrated to provide the measurements of the pump power coupled into the fiber and the total output power of the fiber laser, respectively.

Figure 6:
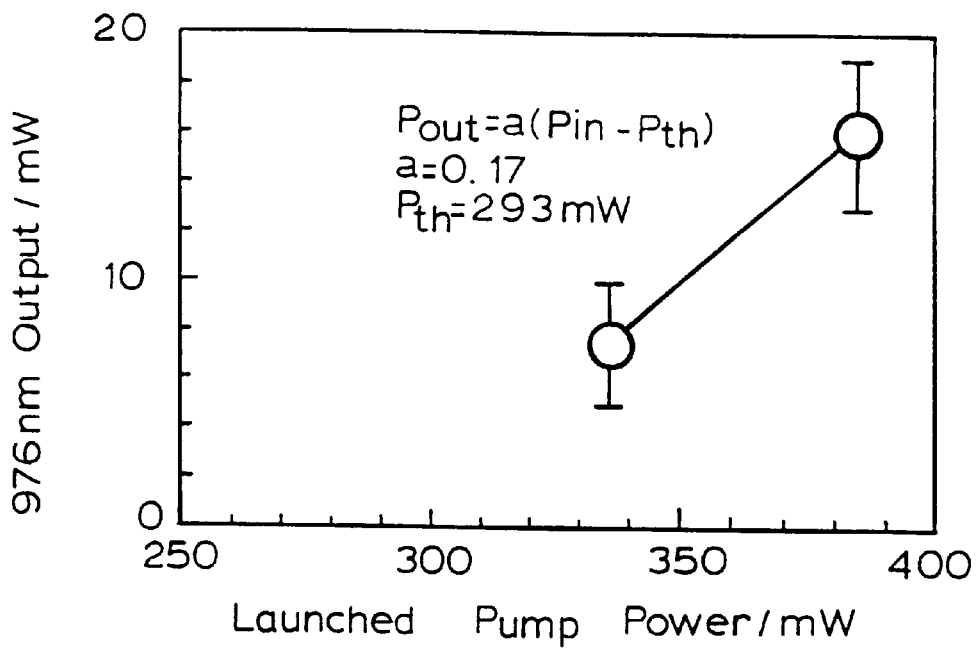
FIG. 6 is a graph illustrating the results obtained from using the test configuration shown in FIG. 5 to determine the efficiency of a Yb-doped fiber laser having a inhomogeneously-broadened germano-silicate core.

FIG. 6 presents the total output power at 976 nm, i.e., $P_{out}$, of a Yb-doped fiber laser having an inhomogeneously-broadened germano-silicate core pump power coupled into the fiber 56, i.e., $P_{in}$. The experimental data are fitted by a straight line $P_{out}=a(P_{in}-P_{th})$, where "a" is the slope efficiency of the laser and $P_{th}$ is the laser threshold. The threshold of the tested laser, i.e., 293 mW, is relatively high, and the slope efficiency is only 17%.

Figure 7:
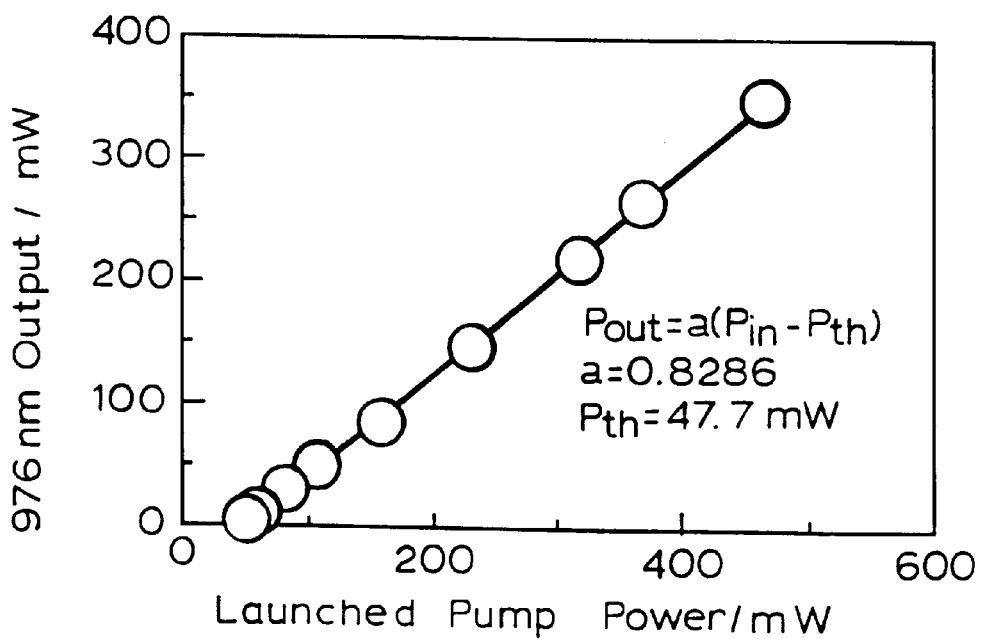
FIG. 7 is a graph illustrating the results obtained from using the test configuration shown in FIG. 5 to determine the efficiency of a Yb-doped fiber laser having a homogeneously-broadened alumino-germano-silicate core.

FIG. 7 presents the total output power at 976 nm of a Yb-doped fiber laser with a homogeneously-broadened alumino-germano-silicate core as a function of the fiber-coupled pump power. Again, the data are fitted by a straight line, $P_{out}=a(P_{in}-P_{th})$, giving the slope efficiency a=82% and laser threshold $P_{th}$=47.7 mW. Thus, the pumping threshold, is relatively low, whereas the slope efficiency very high, approaching the theoretical quantum efficiency limit for such laser, i.e., 94%.

Thus, it can be seen from the foregoing disclosure that the disclosed embodiment of the present invention provides several advantages. By using a homogeneously-broadened Yb-doped host glass, the present invention provides an improved Yb-doped fiber laser that reduces the inefficiencies originating from the three-level energy scheme required for operating such a laser near the absorption band of an EDFA. In particular, the present invention provides a Yb-doped fiber laser that improves the lasing threshold (i.e., the amount of input pump power required before lasing begins) and slope efficiency (i.e., percentage of input power over the threshold that is converted to lasing power) when operating such a laser near the absorption band of an EDFA. According to the present invention, the host glass of the Yb-doped core is made from a homogeneously-broadened material such as alumino-germano-silicate or fluoride glass. The absence of inhomogeneously-broadening in the Yb-doped glass minimizes the number of ions that are left in ground level (a) of the ground manifold during the excitation process, thereby minimizing the number of ions that can absorb the laser light that is generated via stimulated emission to the ground level.

Of course, it should be understood that a range of changes and modifications can be made to the preferred embodiment described above. For example, the present invention is described in connection with particular optical hardware used in assembling and pumping the Yb-doped fiber laser. However, a wide variety of optical configurations could be utilized as long as the essential features described herein are present. It is therefore intended that the foregoing detailed description be regarded as illustrative rather than limiting and that it be understood that it is the following claims, including all equivalents, which are intended to define the scope of this invention.

What is claimed is:

1. A fiber laser comprising:

a light source that generates pump light;

a fiber laser cavity having a core made from a Yb-doped host glass, said fiber having a first end and a second end;

an optical resonator comprising a first partially reflective resonator element adjacent said first fiber end and a second partially reflective resonator element adjacent said second end, said light source coupled to said fiber first end through said first partially reflective resonator element;

said fiber laser cavity, when excited by said source light, outputting laser light from said second resonator element at a wavelength between about 970 nm and about 980 nm;

said light source excitation of said laser cavity comprising exciting ions in said Yb-doped glass, said ions undergoing absorption followed by stimulated emission according to a three-level scheme; and said Yb-doped glass comprising a homogeneously-broadened material.

2. The laser of claim 1 wherein said light source comprises a laser.

3. The laser of claim 2 wherein said laser comprises a diode laser.

4. The laser of claim 1 wherein said homogeneously-broadened material comprises alumino-germano-silicate glass.

5. The laser of claim 1 wherein said homogeneously-broadened material comprises fluoride glass.

* * * * *